Oct. 6, 1942.　　A. C. BOWERS ET AL　　2,298,033
NONMETALLIC TIRE
Filed Dec. 4, 1941　　3 Sheets-Sheet 1
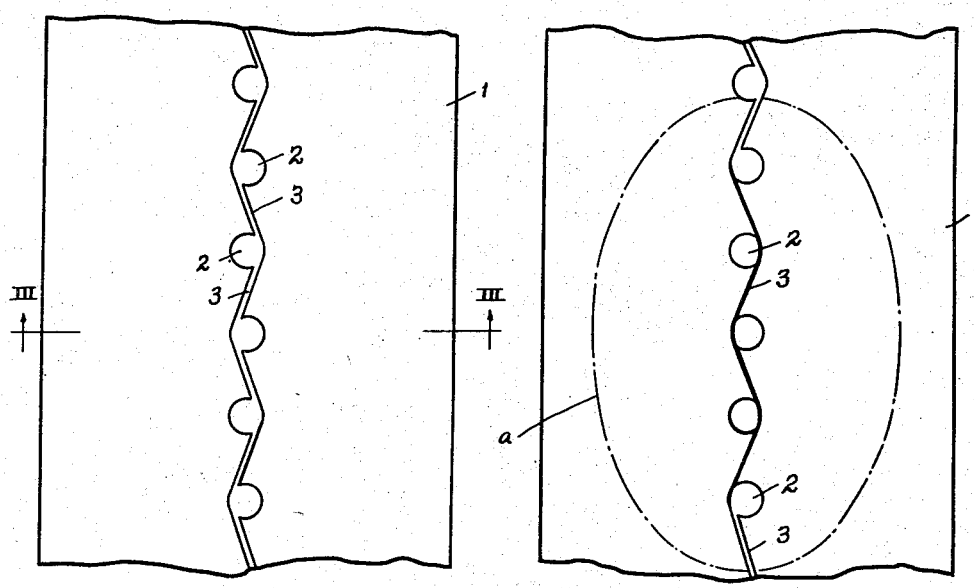
Fig. I.　　Fig. II.
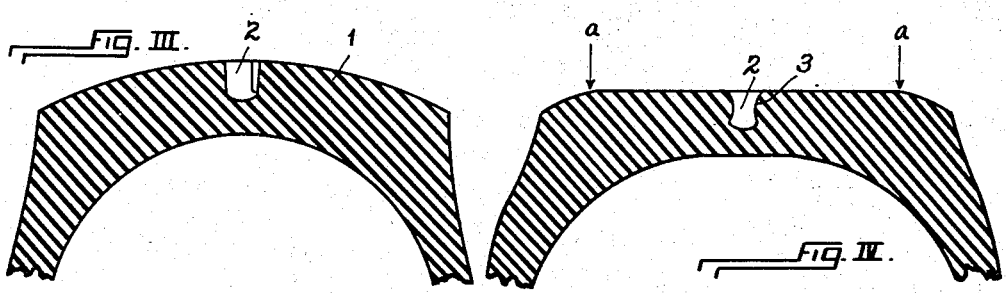
Fig. III.　　Fig. IV.
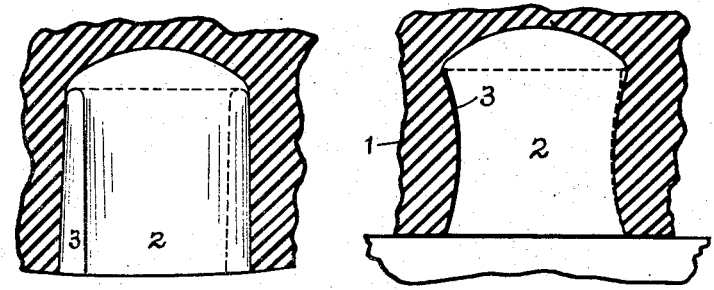
Fig. V.　　Fig. VI.
INVENTORS
Archibald C. Bowers
Charles W. Du Puy
by Christy, Parmelee and Strickland
attorneys Oct. 6, 1942.  A. C. BOWERS ET AL  2,298,033
NONMETALLIC TIRE
Filed Dec. 4, 1941  3 Sheets-Sheet 2
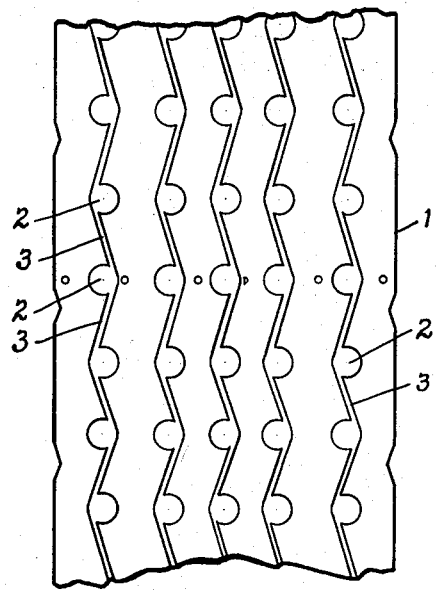
Fig. VII.
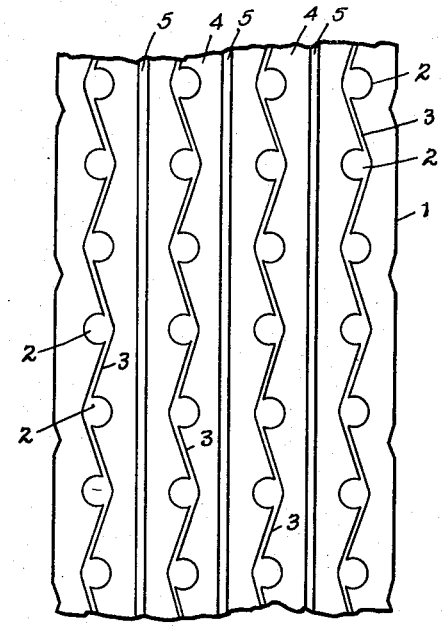
Fig. VIII.
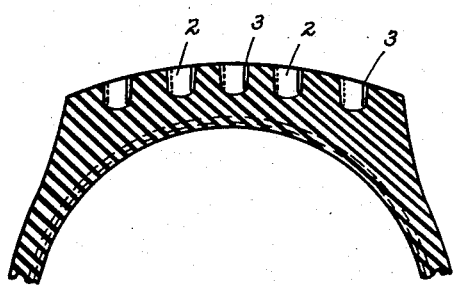
Fig. IX.
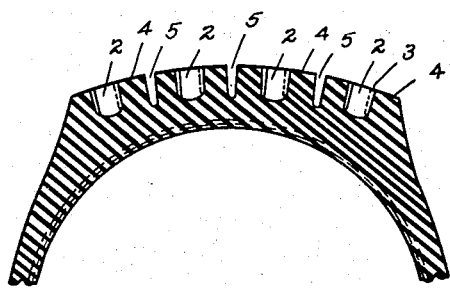
Fig. X.
INVENTORS
Archibald C. Bowers
Charles M. Du Puy
by Christy, Parmelee and Strickland
attorneys Oct. 6, 1942. A. C. BOWERS ET AL 2,298,033
NONMETALLIC TIRE
Filed Dec. 4, 1941 3 Sheets-Sheet 3
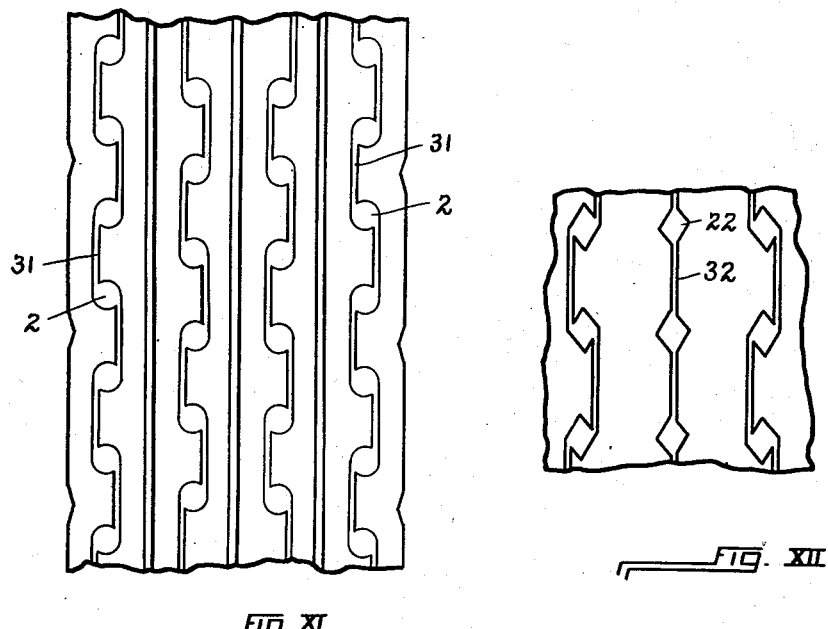
Fig. XI. Fig. XII.
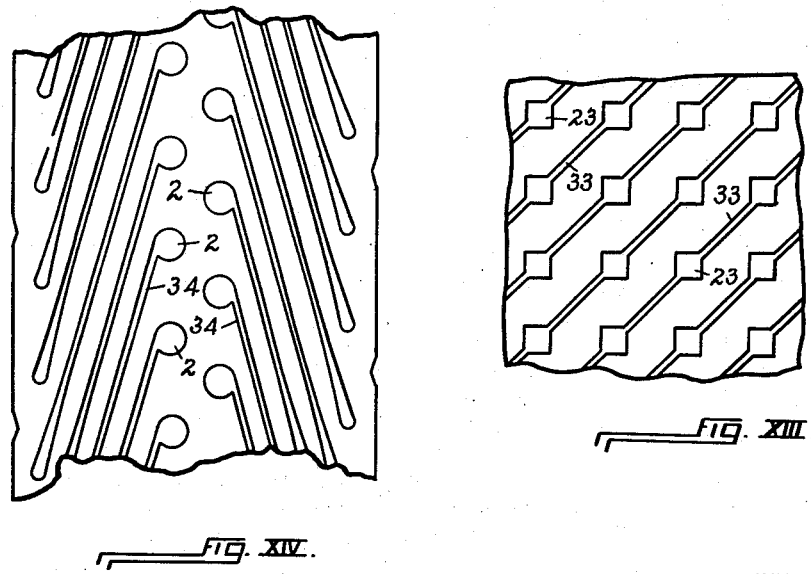
Fig. XIV. Fig. XIII.
INVENTORS
Archibald C. Bowers
Charles M. Du Puy
by Christy, Parmelee and Strickland
attorneys Patented Oct. 6, 1942

2,298,033

UNITED STATES PATENT OFFICE 2,298,033

NONMETALLIC TIRE

Archibald C. Bowers, Akron, Ohio, and Charles M. Du Puy, Greensburg, Pa., assignors to Pennsylvania Rubber Company, Borough of Jeannette, Pa., a corporation of Pennsylvania Application December 4, 1941, Serial No. 421,596

3 Claims. (Cl. 152—209)

This invention relates to non-metallic vehicle tires, and specifically to tires whose road-engaging treads are formed of rubber compounded and processed for such service. It consists in a skid-preventing provision that is effective on the principle of the suction cup, but with a refinement, in consequence of which the noise that attends the use of the familiar suction-cup tire is prevented, and is not produced. The invention is applicable to rubber tires generally. It will suffice, however, to illustrate it in application to the outer shoe of the pneumatic tire of standardized form—the part that in common speech is designated the tire. This application is a continuation in part of now pending application Serial No. 385,423, filed March 27, 1941.

In the accompanying drawings Fig. I is a diagrammatic view in plan of a portion of the tread surface of a tire in which my invention is embodied; Fig. III is a fragmentary view in transverse section, on the plane indicated at III—III, Fig. I; and Fig. V is a view on the same plane of section, though to larger scale and in inverted position, showing particularly the suction cup, with the refinement thereof that characterizes the invention. Figs. II, IV, and VI are views corresponding severally to Figs. I, III, and V, that show the same tire when under load pressure. Figs. VII, IX and VIII, X are pairs of views that, corresponding pair by pair to Figs. I, III, show (with variation in detail) the invention in application to a tire of a refined shape and of wide acceptance in the industry. Figs. XI, XII, and XIII are views that, corresponding to Fig. VII, illustrate variations in details of shape of the feature in which the invention lies. Fig. XIV is a view corresponding to Fig. VII and illustrating further permissible variation.

A tire when inflated is of rounded general contour, both circumferentially and transversely. In service, however, and under load pressure it is deformed slightly, and it shapes itself to the road surface over an area which (the road surface being plane and smooth) is elliptical. Such area is in Figs. II and IV indicated diagrammatically at $a$. The surface of the tread of the tire of this invention is substantially of such general contour. Through the surface and into the tread I of the tire, within the belt defined by the lateral extent of area $a$ (Fig. II), is such a succession of pockets 2. These pockets succeed one another circumferentially of the tire; preferably they will be arranged in exact circumferential alignment, as in all of the figures they are shown to be arranged; and ordinarily they will be arranged in a plurality of lines, as shown in Figs. VII, VIII, XI—XIV. The pockets so sunk in the elastic material of the tire tread are of such shape and size as to afford the well-known suction-cup effect. As the body of the tire tread is compressed upon the pavement and distorted, the pockets are diminished in volume, and their edges are sealed to the pavement (particularly if the surface be wet) at an instant when the volume is near the minimum. When thereafter, with relief of load pressure, the elastic body tends to resume normal shape and the volume of the pocket increases, the consequent suction will hold the vehicle more firmly to the pavement, with corresponding increase of resistance to skidding.

By way of example merely, and not by way of limitation, in a seven-inch tire for a pleasure-car wheel of ordinary size (the tire of Figs. VIII and X) the tread measures 5.14 inches from side to side. The tread is rounded transversely to a radius of 7.414 inches, so that on the line of curvature the tread is 5.25 inches wide. Each pocket is of circular cross-section, 0.4 of an inch in diameter at the tread surface, 0.445 of an inch deep, tapering slightly inward, and rounded at the bottom. Again, the tire of Figs. VII and IX is a six-inch tire. In it the pockets are approximately 0.324 of an inch in diameter at the tread surface and approximately 0.415 of an inch deep.

The invention consists in providing, in addition to a succession of such pockets, a succession of pocket-venting grooves, grooves of such dimensions and arrangement that, as the load pressure increases they will close, isolating the successive pockets from one another, and as the pressure diminishes they will open again and relieve the partial vacuum that has for an instant been formed in the pockets. The arrangement is preferably that shown in Figs. I, II, VII, and VIII, wherein grooves 3 extend from pocket to pocket in the succession. The pockets being circular, the relatively narrow grooves are arranged in substantial tangency to the circles of the two pockets between which they extend, and, as shown in the figures last enumerated, the grooves extend obliquely from one side of one pocket to the other side of the other. The line of the grooves extends in zig-zag course throughout the succession of aligned pockets.

Under load pressure the body of elastic rubber spreads, collapsing the grooves, bringing the opposite walls of the grooves to contact and so hermetically isolating the pockets. This is illustrated in Figs. I and II, V and VI. As the load pressure becomes fully effective within the area $a$—$a$, the grooves collapse, and the isolated pocket serves with its known suction-cup effect. As the pressure diminishes the groove to rearward opens and the partial vacuum within the pocket is relieved. Such relief of the vacuum is accomplished without the popping sound that attends the use of the suction-cup tires as it heretofore has been known. Nevertheless, the skid-preventing effect of the suction cup is gained.

In tires of actual construction, of the dimensions given above, and provided with pockets of the shape and dimensions given, the pockets in each row are spaced in direct circumferential lines, at centre to centre spacing of the order of one inch. (Within each circumferential row the spacing may be intentionally varied somewhat; and, as between adjacent rows, the pockets being aligned transversely also, the spacing in longitudinal direction will necessarily vary as the length of the circumference varies.) The grooves are at the tread surface, 0.080–0.075 of an inch wide; they are 0.385–0.360 of an inch deep; they taper slightly inward; and are rounded at the bottom.

The grooves are preferably of depth slightly less than the pockets: they extend to the rim of the rounded bottom of the pocket. If the grooves be of even less depth they still will be serviceable to the ends described until through prolonged use they are worn away.

The actual effect of compression will be clearly understood on comparing Figs V and VI. Fig. V shows pocket 2 and groove 3 uncompressed and open; Fig. VI shows the pocket compressed and the groove closed under compression. It is after the closing of the groove and before its opening again that the pocket performs its suction-cup function, to prevent skidding. It is the opening of the groove that prevents the popping noise and renders the tire silent in operation.

As indicated in Fig. XIV, the grooves 34 may lead laterally and may grow wider as they extend farther from the pockets, and, so arranged and constructed, their serviceability is manifest. The grooves 34 may at their ends remote from the pockets 2 terminate in the body of the tread, as shown; alternatively, the grooves may open through the lateral edges of the tire, this being manifest without illustration. Under load pressure they close hermetically adjacent the pockets. The widening of them in the more remote portion of their extent insures prompt venting when pressure decreases.

In Fig. IX the pockets and the grooves are shown to extend in direction perpendicular to the axis; in Fig. X the direction is radial with respect to the transverse curve of the tire tread. Either arrangement is permissible.

The tire of Figs. VII and IX has pockets and grooves formed in a tread that otherwise is smooth. Figs. VIII and X show an elaboration of the tire tread, consisting of outstanding bands 4 separated by circumferential grooves 5. A row of pockets 2 with the interconnecting grooves 3 is formed in each of the bands. The pockets in such case will preferably be arranged precisely in circumferential lines and will be centered in the bands.

The oblique and zig-zag arrangement of the grooves, though now preferred, is not essential; the grooves may extend in circumferential lines and yet in positions of substantial tangency to the pockets that they connect, and they may in position be placed alternately to one side and the other of the aligned pockets. This is indicated, at 31, in Fig. XI.

The arrangement of the grooves to open to the pockets at the sides of the pockets is preferred. Fig. XII, however, serves to indicate that they may open to the pockets on the mid-line. (Note the grooves 32 opening into pockets 22.)

When a plurality of lines of pockets is provided, the grooves 33 may extend obliquely, between the pockets 23 of adjacent rows, as indicated in Fig. XIII.

The pockets, though preferably circular in cross-section, may obviously be oval or elliptical, and, as Figs. XII and XIII suggest, they may be polygonal.

We claim as our invention:

1. A vehicle tire of elastic material having a tread surface adapted under load pressure to engage a smooth road surface over an extended area, the continuity of the engaging surface of the tire being interrupted by a plurality of reentrant pockets arranged in circumferential sequence, the successive pockets being interconnected by reentrant grooves narrower than the pockets, and, like the pockets, normally open at the tread surface, whereby under load pressure the lateral spread of the substance of the tire closes the grooves, and the so isolated pockets make suction engagement with the road, and with relief of pressure the grooves open, venting the pockets noiselessly.

2. A vehicle tire of elastic material having a tread surface adapted under load pressure to engage a smooth road surface over an extended area, the continuity of the engaging surface of the tire being interrupted by a plurality of reentrant pockets arranged in circumferential sequence, and a corresponding plurality of reentrant grooves narrower than the pockets and like the pockets normally open at the tread surface, each groove leading from one of said pockets and extending therefrom circumferentially of the tire, whereby under load pressure the lateral spread of the substance of the tire closes the grooves and the so isolated pockets make suction engagement with the road and with relief of pressure the grooves open, venting the pockets noiselessly.

3. A vehicle tire of elastic material having a tread surface adapted under load pressure to engage a smooth road surface over an extended area, the otherwise smooth and continuous tread of the tire being interrupted by a plurality of reentrant pockets arranged in circumferential sequence and pocket-connecting reentrant grooves, the grooves being narrower than the pockets, and, like the pockets, normally open at the tread surface, whereby, under load pressure, the lateral spread of the substance of the tire closes the grooves, and the so-isolated pockets make suction engagement with the road, and with relief of pressure the grooves open, venting the pockets noiselessly.

CHARLES M. DU PUY.
ARCHIBALD C. BOWERS.